March 30, 1954  A. T. SMITH  2,673,665
COMBINATION HANDLE AND SPOUT CARRIER
Filed April 29, 1952
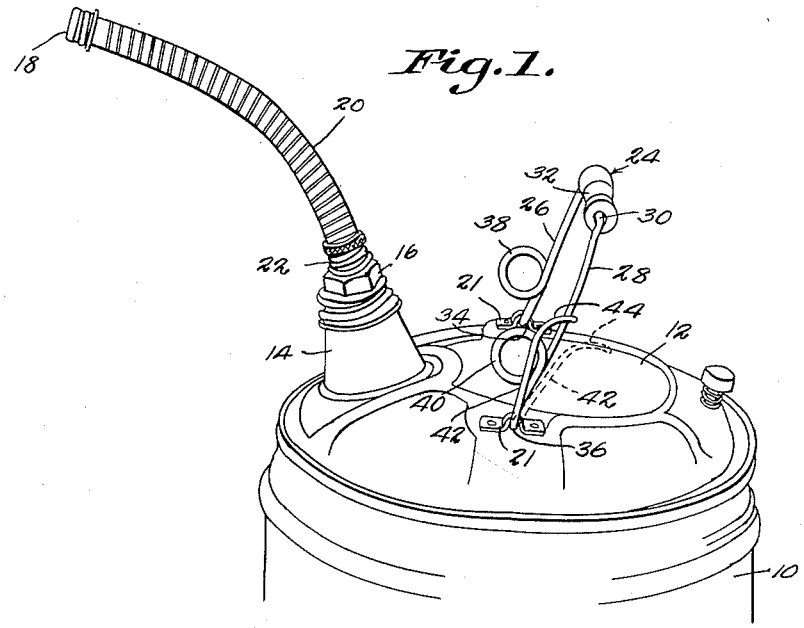
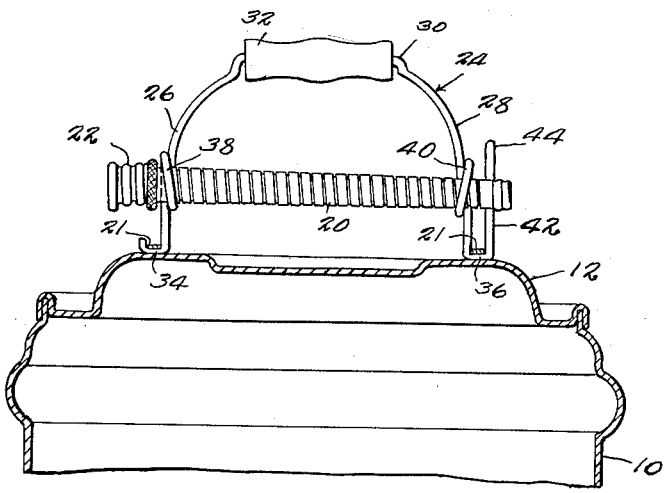
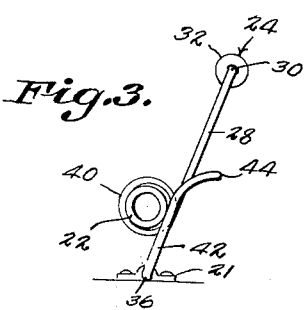
Alva T. Smith
INVENTOR
BY CA Snow &Co.
ATTORNEYS.

Patented Mar. 30, 1954

2,673,665

UNITED STATES PATENT OFFICE 2,673,665

COMBINATION HANDLE AND SPOUT CARRIER

Alva T. Smith, Milwaukee, Wis., assignor to The Alva T. Smith Company, a corporation of Wisconsin Application April 29, 1952, Serial No. 285,049

5 Claims. (Cl. 222—475)

This invention relates to a combination handle and nozzle carrier and has for its primary object to facilitate the transportation of the detachable nozzle of a container such as is commonly employed in the dispensing of gasoline and the like.

In the dispensing and transportation of liquids such as gasoline in portable containers, it becomes necessary to close the discharge spout with a cap in order to avoid fire hazards and the like. When portable containers of the type to which this invention relates are utilized for conveying liquid fuel to the fuel tanks of vehicles, it becomes frequently necessary to supply, in addition to the discharge spout which is commonly fixed to the container, a flexible discharge nozzle that is to be used to properly deliver the contents of the container to the fuel tank without spillage and waste. Since such nozzles are usually wholly open, it is evident that it is not feasible to permit the nozzle to remain on the discharge spout of the receptacle or container during transportation and consequently it has been the practice to transport the discharge nozzles separately from the containers with which they are to be employed. Such practice has frequently resulted in loss of the nozzles or at other times in the failure of the attendant to correlate a nozzle with a container so that when the point of delivery is reached difficulties are encountered in introducing the liquid from the container into the fuel tank to be serviced.

Therefore, this invention has for an object, to provide in a container handle and spout carrier combination of the type in which the discharge nozzle in the form of an elongated spout is removably associated with the handle, nozzle or spout clamping means which employs friction to secure the spout to the handle to prevent accidental disassociation of spout from handle during transportation of a container to which the handle is connected or attached and which clamping means can be manipulated to permit ready disassociation of spout from handle when the spout is to be used.

Specifically, the invention has for an object to provide a container handle and spout carrier arrangement in which the handle is provided with aligned and spaced apertures and the elongated spout is passed through and removably carried in these apertures and with the spout clamping means for frictionally holding the spout in at least one of the apertures.

A further object is to provide an improved spout clamping means comprising a resiliently movable clamping member that is urges to a normal position extending across at least one of the apertures of the handle at an area inwardly of the edge of the aperture and which clamping member is resiliently displaceable to another position to clear the aperture to permit insertion of and passage of a spout therethrough whereby upon release of the clamping member the same moves toward its original or normal position and presses against the spout to clamp the same against the aperture.

The present invention has a further and still more specific object to provide a one-piece wire bail member constituting the container handle and spout carrier in which the resiliently movable clamping member is integral with one of the legs of the bail member and the spout receiving apertures are formed by a pair of loops arranged in alignment with one another and formed integrally with the respective legs of the bail member.

The above and other objects may be attained by employing this invention which embodies among its features a container handle comprising a bail having spaced legs and a bight portion extending between the legs, eyes carried by the legs in concentric spaced relation about a common axis which is spaced from the bight portion, and an arm carried by one of the legs for movement in a path which intersects the common axis for engagement with a nozzle extending through the eyes.

Other features include yieldingly urging the arm toward intersecting relation with the axis of an adjacent eye for clamping a nozzle extending through the eyes against a wall or edge of the said adjacent eye and securely holding the nozzle in position during the transportation of the container by permitting ready removal of the nozzle for attachment to the container spout.

Still other features include forming the bail from a continuous length of cylindrical stock such as a wire, forming loops of the stock intermediate the ends of the legs of the bail which loops lie in concentric spaced relation about a common axis spaced from the bight portion, providing trunnions on the ends of the legs of the bail for pivotally connecting the bail to a container and forming an extension on one of the trunnions and which extension lies in spaced relation to and adjacent one side of one of the legs of the bail and which extension normally intersects the passage through the adjacent eye.

In the drawings,

Fig. 1 is a fragmentary perspective view of a dispensing container showing a handle connected thereto which embodies the features of this invention, and the discharge nozzle connected to the discharge spout, Fig. 2 is a fragmentary sectional view through the container showing the discharge nozzle supported by the handle for transportation, and Fig. 3 is a side view of the handle shown in Fig. 2.

The drawings illustrate the invention as applied to a container 10 provided with a conventional closed top 12 carrying a discharge spout 14 which extends upwardly from the top 12 and is provided with external screw threads by means of which an internally threaded and axially apertured cap 16 may be threadedly engaged with the spout. Conventionally the cap 16 is provided with an externally threaded nipple upon which is threaded an internally threaded dust cap 18.

Containers of the type to which this invention relates are conventionally provided with a detachable elongated flexible discharge nozzle or spout 20. The nozzle 20 has at one end a threaded coupling member 22 which is adapted to be threaded onto the threaded nipple of the dust cap 16 when the cap 18 is removed therefrom. The nozzle or spout 20 thus providing a flexible conduit through which the contents of the container 10 may be readily directed into the filling opening of a tank or the like. The top 12 of the container conventionally carries spaced straps 21 which serve as a coupling means for a handle by means of which the container may be easily transported when necessary. The structure so far described is conventional and forms no part of the invention herein disclosed.

In place of the conventional handle I employ a handle designated generally at 24 and which comprises a bail having spaced legs 26 and 28 joined by a bight portion 30 on which is mounted a conventional hand grip 32. Formed at the end of the leg 26 remote from the bight portion 30 is a trunnion 34 which is adapted to be received beneath one of the straps 21 and carried by the opposite leg 28 of the bail remote from the bight portion 30 thereof is a trunnion 36 which extends through the opening formed between the top of the container and the opposite strap 21. A loop 38 is formed intermediate the ends of the leg 26 and a similar loop 40 is formed intermediate the ends of the leg 28. These loops 38 and 40 form eyes which lie along a common axis which is spaced from the bight portion 30 and lies to one side of the bail to one side of the plane containing the axis of the legs.

Carried by the trunnion 36 adjacent the end thereof remote from the leg 28 is an extension 42 which as illustrated in Fig. 2 extends along the side of the handle 24 in spaced relation to the leg 28 and lies across the opening of the loop 40 to form a resilient clamping arm for the nozzle 20 when the latter extends through the eyes. An arcuate projection 44 is carried by the extension 42 remote from the trunnion 36 to provide a thumb piece for engagement by a thumb or finger of the user so that the extension 42 may be moved away from the loop 40 in an arcuate path which lies substantially perpendicular to the common axis encircled by the loops 38 and 40. The arm normally tends to be across the path occupied by the nozzle 20 when the latter extends through the eyes but owing to its resilience the arm may be moved out of such path to clear the loop 40 as suggested in the dotted lines in Fig. 1 during the insertion or removal of the nozzle to and from carrying position on the handle.

Obviously by gripping the grip 32, the container 10 may be transported by hand to a desired location in the same manner as any similar container equipped with a conventional bail type handle. As previously explained, it is customary to handle liquids, particularly inflammable liquids, in such a container and to close the spout 14 with the detachable cap 18. Of course when the cap is in place on the spout, the nozzle 20 cannot be accommodated thereon and when the ordinary handle is employed the user must carry the nozzle in his other hand. With the device under consideration, the nozzle 20 may be extended through the eyes formed by the loops 38 and 40 by simply moving the arm 42 into the dotted line position shown in Fig. 1 by exerting pressure on the extension 44. Upon releasing such pressure, the arm 42 will spring back substantially into the position illustrated in Fig. 3 to engage the nozzle 20 and clamp it in place in the eye 40. In this way the nozzle may be transported with the container even though the cap 18 is in place on the threaded nipple of the cap 16 and when it is desired to discharge the contents of the container through the nozzle, pressure is applied on the thumb piece 44 to move the arm 42 in its arcuate path and out of contact with the nozzle 20 whereupon the latter may be extracted from its position in the eyes so that upon removing the cap 18 from the threaded nipple of the cap 16, the nozzle may be threadedly engaged with the threaded nipple for directing the discharge of the contents of the container.

It is believed clear therefore that the present invention provides an improvement in a container handle and spout carrier combination of the type in which an elongated spout is passed through and removably carried in aligned and spaced apertures in the handle. This improvement comprises spout clamping means comprising a resiliently movable clamping member urged to a normal position extending across at least one of the apertures at an area inwardly of the edge thereof. The clamping member is resiliently displaceable in a plane perpendicular to the axis of the apertures to another position to clear the aperture to permit insertion of and passage of a spout therethrough. It follows that upon release of the clamping member with the spout inserted, the clamping member moves toward its normal position and presses against the inserted spout to clamp the same against the edge of the aperture at an area spaced from the first mentioned area of the edge of the aperture to prevent accidental disassociation of the spout from the handle during transportation of a container to which the handle is connected.

Specifically, the present invention provides a container handle and spout carrier comprising a one-piece wire bail member that includes spaced legs lying in a common plane and a bight portion extending between and interconnecting the legs. Each leg includes an integral loop spaced from the bight portion. The loops are in alignment with one another, have a common axis lying to one side of the plane containing the axes of the legs and are adapted to receive an elongated spout or nozzle. An integral and resilient extension of one of the legs is bent back and extends toward the bight portion a distance such as to extend beyond the loop in the said one leg. This extension constitutes a spout clamping arm and lies in a normal position extending across the said one loop at an area inwardly of the edge thereof. The extension is resiliently displaceable in a direction away from the axis of the loop to a position to clear the loop so as to permit the spout to be inserted and passed through both loops. Upon release of the extension, the same resiliently moves toward its normal position and contacts and presses against the inserted spout to clamp the same against the edge of the loop to prevent accidental disassociation of spout from handle.

As further specific features, the legs of the one-piece wire bail member each embody means for movably connecting the bail member to a container and the loops that form spout receiving apertures are spaced from the bight portion a distance sufficient to permit a hand to pass between the inserted spout and the bight portion when the invention is being utilized so as not to damage the inserted spout.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

1. In a container handle and spout carrier combination of the type in which an elongated spout is passed through and removably carried in aligned and spaced apertures in the handle, the improvement comprising spout clamping means comprising a resiliently movable clamping member urged to a normal position extending across at least one of the apertures at an area inwardly of the edge thereof, said clamping member being resiliently displaceable to another position to clear the aperture to permit insertion of and passage of a spout therethrough whereby upon release of the clamping member the same moves toward its normal position and presses against the inserted spout to clamp the same against the edge of the aperture at an areas spaced from the first mentioned area of the edge to prevent accidental disassociation of spout from handle during transportation of a container to which the handle is connected.

2. In a combined container handle and spout carrier, a handle member including spaced legs and a bight portion extending between and interconnecting the legs, means on each leg defining a spout receiving aperture, said apertures being in alignment, spaced from the bight portion and having a common axis extending transversely of the legs and adapted to removably receive an elongated spout therethrough and resilient means for removably clamping the spout in at least one of the apertures comprising a resilient arm carried by one of the legs and connected thereto on the side of the common axis remote from the bight portion, said arm being biased to a normal position extending across the adjacent aperture at an area inwardly of the edge thereof and having a length such as to terminate in a free end on the side of the common axis adjacent the bight portion, said arm being resiliently displaceable upon manually moving the free end in a plane lying perpendicular to the common axis and in a direction away from said axis to a position to clear the said adjacent aperture to permit a spout to be inserted and passed through both apertures whereby upon release of the free end the arm moves back toward the common axis and contacts and presses against the inserted spout to clamp the same against the edge of the aperture at an area spaced from the first mentioned area of the edge to prevent accidental disassociation of spout from handle during transportation of a container to which the handle is connected.

3. A container handle and spout carrier combination comprising a handle member including spaced legs and a bight portion extending between and interconnecting the legs, means on each leg for movably connecting the handle to a container, means on each leg respectively equidistant from the bight portion and defining a spout receiving aperture, said apertures being in alignment and adapted to removably receive an elongated spout therethrough, said apertures being spaced from the bight portion a distance sufficient to permit a hand to pass between an inserted spout and the bight portion when the handle is in use and resilient means for removably clamping the spout in at least one of the apertures comprising at least one resilient arm carried by one of the legs and normally extending across the adjacent aperture at an area inwardly of the edge thereof, said arm being resiliently displaceable in a plane lying perpendicular to the axis of the aperture and away from the axis to a position to clear the edge of the aperture to permit a spout to be inserted and passed through both apertures whereby upon release of the arm the same resiliently moves back toward the axis of the aperture and contacts and presses against the inserted spout to clamp the same against the edge of the aperture at an area spaced from the first mentioned area of the edge to prevent accidental disassociation of spout from handle during transportation of a container to which the handle is connected.

4. A container handle and spout carrier comprising a one-piece wire bail member including spaced legs and a bight portion extending between and interconnecting the legs, each leg including integral loops spaced from the bight portion, said loops being in alignment with one another, having a common axis extending transversely of the legs and adapted to receive an elongated spout and spout clamping means comprising an integral extension of at least one of the legs bent back and extending toward the bight portion a distance such as to extend beyond the loop in the said one leg, said extension lying in a normal position extending across the said loop at an area inwardly of the edge thereof, said extension being resiliently displaceable in a direction away from the axis of the said loop to a position to clear the said loop so as to permit a spout to be inserted and passed through both loops, whereby upon release of the extension the same resiliently moves toward its normal position and contacts and presses against the inserted spout to clamp the same against the edge of the loop at an area spaced from the first mentioned area of the edge of the said loop to prevent accidental disassociation of spout from handle during transportation of a container to which the handle is connected.

5. A container handle and spout carrier as defined in and by claim 4 in which the axes of the legs lie in a common plane and in which the common axis of the loops lie to one side of the plane containing the axes of the legs.

ALVA T. SMITH.

References Cited in the file of this patent

FOREIGN PATENTS

| Number | Country | Date |
|---|---|---|
| 438,566 | France | Mar. 19, 1912 |